United States Patent [19]

Hirota

[11] 4,229,220
[45] Oct. 21, 1980

[54] EDGE-COATING GLASS FOR LASER DISKS

[75] Inventor: Shinichiro Hirota, Hachioji, Japan

[73] Assignee: Hoya Corporation, Tokyo, Japan

[21] Appl. No.: 71,413

[22] Filed: Aug. 30, 1979

Related U.S. Application Data

[63] Continuation of Ser. No. 937,642, Aug. 28, 1978, abandoned.

[30] Foreign Application Priority Data

Aug. 31, 1977 [JP] Japan .............................. 52/104664

[51] Int. Cl.$^2$ .............................................. C03C 3/16
[52] U.S. Cl. ................................................ 106/47 R
[58] Field of Search ........................... 106/47 R, 47 Q

[56] References Cited

U.S. PATENT DOCUMENTS

| | | | |
|---|---|---|---|
| 3,746,556 | 7/1973 | Morgan | 106/47 R |
| 3,923,527 | 12/1975 | Matsuura et al. | 106/47 R |
| 4,060,422 | 11/1977 | Asabarc | 106/47 R |

Primary Examiner—O. R. Vertiz
Assistant Examiner—Mark Bell
Attorney, Agent, or Firm—Sughrue, Rothwell, Mion, Zinn and Macpeak

[57] ABSTRACT

A glass for coating a laser glass and which has a high absorption for laser light which comprises, in mol %, 51 to 59% $P_2O_5$; 0 to 8% $B_2O_3$; 4 to 10% $Al_2O_3$; 0 to 20% $Li_2O$; 0 to 17% $Na_2O$; 8 to 20% $Li_2O+Na_2O$; 0 to 23% ZnO; 0 to 15% BaO; 7 to 28% CuO; and 0 to 13% $V_2O_5$.

1 Claim, 1 Drawing Figure

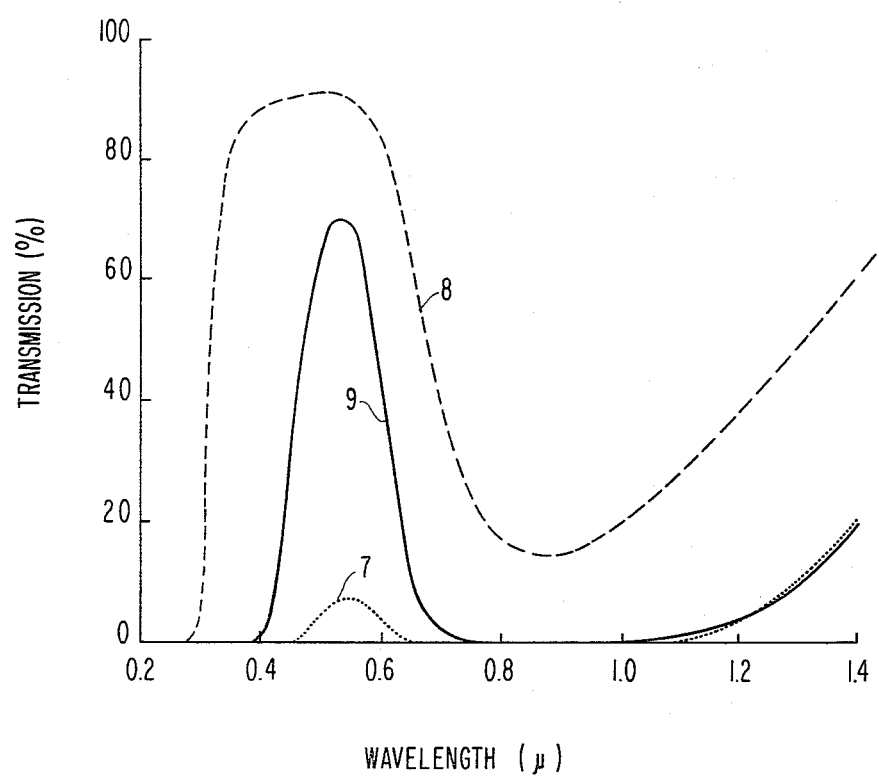

EDGE-COATING GLASS FOR LASER DISKS

This is a continuation of application Ser. No. 937,642, filed Aug. 28, 1978, now abandoned.

BACKGROUND OF THE INVENTION

1. Field of the Invention:

The present invention relates to edge-coating glasses, which optically have a low refractive index, have a marked absorption in the near infrared region and have excellent chemical durability for parasitic oscillation of laser glasses.

2. Description of the Prior Art:

Recently, a thin layer of a low melting point glass which has a slightly higher refractive index than that of a laser glass and absorbs well laser light of a wavelength of $1.06\mu$ has been applied to the circumferential edge of a laser glass disk in order to prevent reflection and scattering of laser light to improve the oscillation characteristics.

For this purpose, although a low melting point glass has been employed in U.S. Pat. No. 4,060,422 (corresponding to Japanese Patent Application (OPI) 69917/77) (The term "OPI" as used herein refers to a "published unexamined Japanese patent application".), this low melting point glass has not only the defect of a low chemical durability, which is a general characteristic of a low melting point glass, but also a low absorption coefficient of light of a wavelength of $1.06\mu$. Consequently, the laser light passes through the thin layer of the low melting point glass, is reflected at the interface of the air and the layer and passes again into the laser glass. As a result the oscillation characteristics have not been sufficiently improved yet.

SUMMARY OF THE INVENTION

The present invention has been attained by discovering edge-coating glass compositions which have the characteristics that they are capable of firmly adhering by fusing at the softening point, Sp, of the laser glass without devitrification occurring and they do not warp and, as a result, break when the temperature is reduced to room temperature after the adhering by fusing, because the coefficient of thermal expansion of the low melting point glass is similar to that of the laser glass. As a result, the oscillation characteristics are remarkably improved, because the absorption coefficient at $1.06\mu$ is remarkably higher than that of the prior known glass, and the chemical durability which is a general defect of a low melting point glass is improved. A laser glass which can be used in the present invention is a phosphoric glass, e.g., having a composition comprising, in mol %, 55% $P_2O_5$, 4% $B_2O_3$, 8% $Al_2O_3$, 7.5% $Li_2O$, 7.5% $Na_2O$, 16% $CaO$ and 2% $V_2O_5$ and having a softening point, Sp, of 540° C., a coefficient of thermal expansion of $110 \times 10^{-7}$/°C. and a refractive index at $1.06\mu$ of 1.5.

The edge-coating glass of the present invention comprises, in mol %, 51 to 59% $P_2O_5$; 0 to 8% $B_2O_3$; 4 to 10% $Al_2O_3$; 0 to 20% $Li_2O$; 0 to 20% $Na_2O$; 8 to 20% $Li_2O + Na_2O$; 0 to 23% $ZnO$; 0 to 15% $BaO$; 7 to 28% $CuO$; and 0 to 13% $V_2O_5$.

BRIEF DESCRIPTION OF THE DRAWING

The drawing shows percent transmission curves of examples of glasses of the present invention, wherein 7, 8 and 9 each means the percent transmission curve of the glass of Example 7, 8 or 9 at a thickness of 0.28 mm, 0.15 mm and 0.24 mm, respectively.

DETAILED DESCRIPTION OF THE INVENTION

Each component in the edge-coating glass of the present invention is within the ranges set forth above for the following reasons. All percents given herein are in terms of mol %.

$P_2O_5$ is a glass forming oxide for maintaining a low refractive index and a low melting point for the edge-coating glass, and the edge-coating glass becomes unstable as a glass to be adhered by fusing, if the amount of the $P_2O_5$ is less than 51% or more than 59%.

Although $B_2O_3$ shows an excellent stabilizing effect on the edge-coating glass, if the amount of $B_2O_3$ is above 8%, the edge-coating glass becomes somewhat unstable and the melting point of the glass becomes high.

$Al_2O_3$ is an essential component for improving the chemical durability of the edge-coating glass. If the amount of $Al_2O_3$ is less than 4%, the chemical durability of the edge-coating glass deteriorates and, if the amount of $Al_2O_3$ is more than 10%, the edge-coating glass becomes unstable.

$Li_2O$ and/or $Na_2O$ is an essential component for maintaining a low melting point for the edge-coating glass and the $Li_2O$ and/or $Na_2O$ is present in an amount of 8% or more. However, if the amount of $Li_2O$ and/or $Na_2O$ is above 20%, the coefficient of thermal expansion of the edge-coating glass becomes high and strains occur causing the edge-coating glass to break because of the difference in the coefficient of thermal expansion of the edge-coating glass and that of the laser glass, when the edge-coating glass is adhered to the laser glass by fusing.

ZnO is a component which provides the edge-coating glass with a comparatively low coefficient of thermal expansion and a low melting point and ZnO is used for adjusting the coefficient of thermal expansion to that of the laser glass by replacing the $Li_2O$ and/or $Na_2O$ with ZnO. However, if the amount of ZnO is above 23%, the edge-coating glass becomes unstable.

BaO can be used for adjusting the coefficient of thermal expansion of the edge-coating glass to that of the laser glass. Although BaO improves the chemical durability of the edge-coating glass, the softening point of the edge-coating glass increases, if the amount of BaO is above 15%.

CuO is a laser light absorbing component having a marked absorption at a wavelength of 0.7 to $1.3\mu$. Although the CuO must be present in an amount of 7% or more to sufficiently absorb laser light of a wavelength of $1.06\mu$, the edge-coating glass becomes unstable if the amount of CuO is above 28%.

$V_2O_5$ is also a laser light absorbing component similar to CuO and shows an effect on stabilization of the edge-coating glass. However, if the amount of $V_2O_5$ is above 13%, the softening point of the edge-coating glass becomes remarkably high. Further, since $V_2O_5$ increases the refractive index, $V_2O_5$ is used for adjusting the refractive index of the edge-coating glass to that of the laser glass.

The coefficient of thermal expansion for the edge-coating glass of the present invention generally ranges from about 90 to $125 \times 10^{-7}$/°C., the degree of absorption for laser light of the edge-coating glass of the present invention ranges from about 85 to about 300 cm$^{-1}$ at 1.06μ and the absorption range for the oscillation wavelength of Nd-laser light of the edge-coating glass of the present invention is about 1 to about 1.4μ.

The edge-coating glass of the present invention can be coated on a laser glass and representative examples of suitable laser glasses which can be used are described in, for example, U.S. Patent Application Ser. No. 851,914 filed Nov. 16, 1977, now abandoned.

In use, starting materials for each of the components used in the edge-coating glass of the present invention, e.g., $H_3PO_4$, $H_3BO_3$, $Al(OH)_3$, $Li_2CO_3$, ZnO, $BaCO_3$, CuO and $V_2O_5$, are mixed and the starting material mixture is charged into a platinum crucible or a silica crucible and melted at 1150° C. for 20 to 30 min., followed by cooling and pulverizing.

The edge-coating glass powders thus obtained are blended with an appropriate bonding agent, and the resulting mixture is then applied to the surface of a laser glass. The laser glass is heated and maintained at a temperature near the softening point of the laser glass for an appropriate period of time, followed by cooling to room temperature.

Examples of edge-coating glasses of the present invention, along with their thermal, optical and chemical properties, are illustrated below. Further, the percent transmission curves 7, 8 and 9 of Examples 7, 8 and 9 at a thickness of 0.28 mm, 0.15 mm and 0.24 mm, respectively, are shown below.

| Example No. | Softening Point Sp (°C.) | Coefficient of Thermal Expansion ($10^{-7}$/°C.) | Refractive Index (1.06 μ) | Coefficient of Absorption (1.06 μ) ($cm^{-1}$) | Loss of Weight in Water (100° C., 1 hr) (%) |
| --- | --- | --- | --- | --- | --- |
| 1 | 447 | 106 | 1.566 | 284 | 0.63 |
| 2 | 446 | 114 | 1.539 | 117 | 0.40 |
| 3 | 459 | 105 | 1.525 | 192 | 0.16 |
| 4 | 464 | 103 | 1.563 | 173 | 0.35 |
| 5 | 423 | 93 | 1.532 | 90 | 0.73 |
| 6 | 427 | 118 | 1.511 | 92 | 0.21 |
| 7 | 460 | 104 | 1.565 | 211 | 0.20 |
| 8 | 447 | 105 | 1.531 | 91 | 0.14 |
| 9 | 464 | 105 | 1.539 | 217 | 0.15 |
| 10 | 462 | 112 | 1.535 | 120 | 0.12 |
| 11 | 449 | 109 | 1.527 | 156 | 0.25 |
| 12 | 453 | 109 | 1.528 | 117 | 0.22 |

When a sample of these glasses was heat-treated for 6 hours at 530° C. on the above described laser glass and cooled slowly, these edge-coating glasses were stable and devitrification did not occur. These edge-coating glasses firmly adhered to the laser glass by softening.

These edge-coating glasses were produced using $H_3PO_4$, $H_3BO_3$, $Al(OH)_3$, $Li_2CO_3$, $Na_2CO_3$, ZnO, $BaCO_3$, CuO and $V_2O_5$ as starting materials by mixing them and melting at 1150° C. for 20 to 30 minutes in a silica crucible.

| Example No. | Composition (mol %) | | | | | | | | |
| --- | --- | --- | --- | --- | --- | --- | --- | --- | --- |
| | $P_2O_5$ | $B_2O_3$ | $Al_2O_3$ | $Li_2O$ | $Na_2O$ | ZnO | BaO | CuO | $V_2O_5$ |
| 1 | 51 | 4 | 4 | 5.5 | 5.5 | — | — | 28 | 2 |
| 2 | 51 | 4 | 4 | 7.5 | 7.5 | — | 14.5 | 7.5 | 4 |
| 3 | 52 | 8 | 8 | 8 | 8 | — | — | 16 | — |
| 4 | 55 | — | 6 | 7.5 | 7.5 | 4 | — | 7.5 | 12.5 |
| 5 | 55 | — | 6 | 8.5 | — | 23 | — | 7.5 | — |
| 6 | 55 | — | 8 | — | 16.5 | 13 | — | 7.5 | — |
| 7 | 55 | — | 8 | 7.5 | 7.5 | — | — | 14.5 | 7.5 |
| 8 | 55 | — | 10 | 8 | 8 | 11.5 | — | 7.5 | — |
| 9 | 55 | 4 | 8 | 7.5 | 7.5 | — | — | 16 | 2 |
| 10 | 56 | 4 | 8 | 6.5 | 6.5 | — | 9 | 10 | — |
| 11 | 56 | 4 | 8 | 19 | — | — | — | 13 | — |
| 12 | 59 | — | 8 | 7.5 | 7.5 | 6.5 | — | 7.5 | 4 |

As can be seen from the above table, the preferred compositional ranges are, in mol %, 51 to 59% $P_2O_5$; 0 to 8% $B_2O_3$; 4 to 10% $Al_2O_3$; 0 to 19% $Li_2O$; 0 to 16.5% $Na_2O$; 8.5 to 19% $Li_2O+Na_2O$; 0 to 23% ZnO; 0 to 14.5% BaO; 7.5 to 28% CuO; and 0 to 12.5% $V_2O_5$.

While the invention has been described in detail and with reference to specific embodiments thereof, it will be apparent to one skilled in the art that various changes and modifications can be made therein without departing from the spirit and scope thereof.

What is claimed is:

1. A glass for coating a laser glass, having a high absorption for laser light consisting essentially of, in mol %, 51 to 59 % $P_2O_5$; 0 to 8% $B_2O_3$; 4 to 10% $Al_2O_3$; 0 to 19% $Li_2O$; 0 to 16.5% $Na_2O$; 8.5 to 19% $Li_2O+Na_2O$; 0 to 23% ZnO; 0 to 14.5% BaO; 7.5 to 28% CuO; and 0 to 12.5% $V_2O_5$.

* * * * *